United States Patent
Sykes et al.

(10) Patent No.: US 6,920,335 B2
(45) Date of Patent: Jul. 19, 2005

(54) METHOD OF MANAGING THE OPERATION OF A MOBILE TERMINAL IN A TELECOMMUNICATIONS NETWORK

(75) Inventors: Francis Sykes, Paris (FR); Bruno Aidan, Paris (FR)

(73) Assignee: Alcatel, Paris (FR)

( * ) Notice: Subject to any disclaimer, the term of this patent is extended or adjusted under 35 U.S.C. 154(b) by 591 days.

(21) Appl. No.: 09/887,153

(22) Filed: Jun. 25, 2001

(65) Prior Publication Data

US 2002/0019240 A1 Feb. 14, 2002

(30) Foreign Application Priority Data

Jun. 30, 2000 (FR) .............................................. 00 08492

(51) Int. Cl.[7] .................................................. H04Q 7/20
(52) U.S. Cl. .................................. 455/552.1; 455/127.4
(58) Field of Search ............................. 455/552.1, 566, 455/466, 90.1, 127.4, 553.1, 551; 709/219, 223, 311, 329, 246, 217–221; 370/395.5–395.61

(56) References Cited

U.S. PATENT DOCUMENTS

| 5,903,832 | A | * | 5/1999 | Seppanen et al. ........ 455/435.3 |
| 5,923,736 | A | | 7/1999 | Shachar |
| 6,075,778 | A | * | 6/2000 | Sugita ........................ 370/335 |
| 6,336,137 | B1 | * | 1/2002 | Lee et al. .................... 709/219 |
| 6,389,288 | B1 | * | 5/2002 | Kuwahara et al. ........ 455/456.6 |
| 6,430,624 | B1 | * | 8/2002 | Jamtgaard et al. .......... 709/246 |
| 6,624,809 | B1 | * | 9/2003 | Kowaguchi ................. 345/169 |

* cited by examiner

Primary Examiner—Jean A. Gelin
(74) Attorney, Agent, or Firm—Sughrue Mion, PLLC

(57) ABSTRACT

A method of managing the operation of a mobile telephone in a telecommunications network, the method being of the type in which the mobile terminal is designed to operate selectively in a telephone call mode or in a navigator mode, and of the type in which display means, forming part of the mobile terminal or connected to the mobile terminal, are suitable for displaying a service data page formatted by a sequence of instructions in a language adapted to service data, the service data page giving access to at least one service. In the method, a "preferred" mobile terminal operating mode is selected for implementing a service by incorporating a preferred mode selection instruction in the sequence of instructions for the service data page giving access to the service. Preferably, the navigator mode uses wireless application protocol (WAP), and the language adapted to service data is taken from the extensible markup language (XML) family, and in particular is wireless markup language (WML). In a variant, the language adapted to service data is hypertext markup language (HTML) or a language derived therefrom.

7 Claims, No Drawings

METHOD OF MANAGING THE OPERATION OF A MOBILE TERMINAL IN A TELECOMMUNICATIONS NETWORK

The present invention relates to a method of managing the operation of a mobile terminal in a telecommunications network.

BACKGROUND OF THE INVENTION

In the state of the art, a method of managing the operation of a mobile telephone in a telecommunications network is already known in which the mobile terminal is designed to operate selectively in a telephone call mode or in a navigator mode, and in which display means, forming part of the mobile terminal or connected to the mobile terminal, are suitable for displaying a service data page formatted by a sequence of instructions in a language adapted to service data, the service data page giving access to at least one service.

In conventional manner, in a mobile telephone network, the wireless application protocol (WAP) enables a mobile terminal to interchange data with an Internet type network (IP technology) or an intranet network. The language adapted to service data and adapted to mobile terminals is usually wireless markup language (WML). This language is adapted to the limited display means of a mobile terminal (screen of small size and generally monochrome) and to the limited means available for interactivity between a user and the display means of the mobile terminal (simplified keypad, or thumb wheel).

As a general rule, the operator running the mobile telephone network manages a computer or "WAP" gateway that provides translation between protocols adapted to the Internet, specifically the transmission protocol known as hypertext transfer protocol (HTTP) and the security protocol known as transport layer security (TLS), and the corresponding protocols adapted to the WAP standard, specifically the transmission protocols known as wireless session protocol (WSP) and wireless translation protocol (WTP), and the security protocol known as wireless transport layer security (WTLS). The WAP gateway thus serves to convert data between the mobile telephone network run by the operator and the Internet. The operator managing the WAP gateway can thus provide subscribers with a "WAP portal" via which various different services are proposed.

In general, when a subscriber connects to the WAP portal (with the mobile terminal operating in navigator mode), the various services proposed by the operator are accessed by means of functions displayed on the screen of the mobile terminal. As a general rule, a service is selected by means of the keys, arrow buttons, an arrow navigator, a thumb wheel, etc. on the keypad. The selected service is generally accessed by pressing an "enter" button on the keypad. Nevertheless, in order to make the mobile terminal operate in telephone mode, the user must exit navigator mode and thus leave WAP mode.

An example of conventional operation of the mobile terminal in navigator mode is described below.

A subscriber possessing voice mail uses navigator mode to consult a mail management service that is accessible via the WAP portal of the operator. By way of example, a service data page could then be displayed in the following form:

| Voice messages | | |
|---|---|---|
| 1. | Normal. | Secretary |
| 2. | Urgent. | Boss |
| 3. | Normal. | Unknown |
| 4. | Urgent. | + 33 6 00 00 00 00 |

The subscriber selects option "2. Urgent. Boss" in order to listen to the corresponding message and conventionally that has the effect of configuring the mobile terminal in telephone call mode. The subscriber cannot then access the other options proposed by the above service data page without leaving telephone call mode and returning to navigator mode. It will be observed that in some cases the call in telephone call mode marks the end of navigation.

OBJECTS AND SUMMARY OF THE INVENTION

An object of the invention is to impart an operating mode to a mobile terminal of a telecommunications network, which mode is always adapted to the current service while avoiding awkward changes between the "telephone call" and "navigator" operating modes of the mobile terminal.

To this end, the invention provides a method of managing the operation of a mobile telephone in a telecommunications network of the above-specified type, wherein a "preferred" mobile terminal operating mode is selected for implementing a service by incorporating a preferred mode selection instruction in the sequence of instructions for the service data page giving access to the service.

According to other characteristics of the method:

the navigator mode uses wireless application protocol (WAP); and either the language adapted to service data is taken from the extensible markup language (XML) family, and in particular is wireless markup language (WML); or else the language adapted to service data is hypertext markup language (HTML) or a language derived therefrom.

DETAILED DESCRIPTION OF THE INVENTION

The invention will be better understood on reading the following description given purely by way of example.

A mobile terminal of a telecommunications network can operate selectively either in telephone call mode or in navigator mode. The mobile terminal has conventional means forming the man-machine interface. These interface means are mounted on the mobile terminal or are united in a separate unit which is connected to the mobile terminal. Telephone call mode corresponds to the mobile terminal operating in such a manner as to enable voice to be transmitted between the terminal and the telecommunications network, and thus corresponds to the man-machine interface operating in a manner that is suitable for telephone usage (marking the duration of the call, the number of the other party, giving access to functions such as "hang-up", "dial", etc.). Navigator mode corresponds to the mobile terminal operating in such a manner as to enable data to be exchanged with an Internet type network or where appropriate an intranet network, and thus to the man-machine interface operating in a manner that is suitable for navigation use (displaying data and navigation functions associated with on-line services).

In conventional manner, the mobile terminal has a screen forming the display means of the man-machine interface and capable of displaying a service data page that is formatted in conventional manner by a sequence of instructions in a language adapted to service data. The service data page gives access to at least one service.

It will be observed that the display means can be part of the mobile terminal or can be connected to said terminal.

Preferably, navigator mode uses the wireless application protocol (WAP) and the language adapted to service data is of the extensible markup language (XML) family, and in particular is wireless markup language (WML). In a variant, the language adapted to service data can be hypertext markup language (HTML) or a language derived therefrom.

In the method, a "preferred" mobile terminal operating mode is selected for implementing a service by incorporating an instruction for selecting the preferred mode in the sequence of instructions for the service data page giving access to the service.

Thus, in WML, a navigator mode selection instruction can be defined as: <type 1> and an instruction for selecting telephone call mode can be defined as: <type 2>.

The sequence of instructions for a service data page including an instruction for selecting navigator mode is thus presented in the following form:

```
<WML>
    <type 1>
    . . .
    </type 1>
</WML>
``` and the sequence of instructions for a service data page including an instruction for selecting telephone call mode is presented in the following form:

```
<WML>
    <type 2>
    . . .
    </type 2>
</WML>
```

EXAMPLE 1

Navigator Mode Preferred

A subscriber possesses voice mail and uses navigator mode to consult a voice mail management service that is accessible via the operator's WAP portal. A service data page including an instruction for selecting navigator mode is then displayed in the following format, for example:

| Voice messages | |
|---|---|
| 1. Normal. | Secretary |
| 2. Urgent. | Boss |
| 3. Normal. | Unknown |
| 4. Urgent. | + 33 6 00 00 00 00 |

The subscriber selects option "2. Urgent. Boss", so as to consult the corresponding message. However, because of the instruction for selecting navigator mode, this mode is maintained, thus making it possible, while the message is being played back, for the service data page to be displayed as follows:

| Voice mail options |
|---|
| 1. Delete message |
| 2. Save message |
| 3. Call sender |
| 4. Voice mail main menu |
| 5. Exit voice mail navigator |

The subscriber selects option "1. Delete message" and then option "4. Voice mail main menu". The screen then displays the following navigator page:

| Voice messages | |
|---|---|
| 1. Normal. | Secretary |
| 2. Normal. | Unknown |
| 3. Urgent. | + 33 6 00 00 00 00 |

The subscriber can then select option "3. Urgent. +33 6 00 00 00 00" in order to consult the corresponding message.

EXAMPLE 2

Telephone Call Mode Preferred

A subscriber wishes to make a call, but does not know the telephone number. To find out the number, the subscriber uses navigator mode to consult a directory service available via the operator's WAP portal. A service data page including an instruction for selecting telephone call mode is then displayed, e.g. in the following format:

| Directory |
|---|
| 1. Name [ ] |
| 2. Forename [ ] |
| 3. Address [ ] |

The subscriber inputs the data and presses "enter". The screen then displays:

| Result of search |
|---|
| NAME |
| Address |
| 1. Call + 0 01 00 00 00 |
| 2. Search another name |
| 3. Add to address book |

The subscriber selects option "1. Call +0 01 00 00 00" so as to call "NAME", with the mobile terminal then operating in its preferred telephone call mode. The screen of the mobile terminal displays the usual information corresponding to this mode of operation so as to give easy access to the usual functions of the telephone call type.

What is claimed is:

1. A method of managing the operation of a mobile terminal in a telecommunications network, the method being of the type in which the mobile terminal is designed to operate selectively in a telephone call mode or in a navigator mode, and of the type in which a display forming part of the mobile terminal or connected to the mobile terminal is suitable for displaying a service data page formatted by a sequence of instructions, the service data page giving access to at least one service, said method comprising the steps of selecting a "preferred" mobile terminal operating mode for implementing a service by incorporating a preferred mode selection instruction in said sequence of instructions.

2. A method according to claim 1, wherein the navigator mode uses wireless application protocol (WAP).

3. A method according to claim 1, wherein the language adapted to service data is taken from the extensible markup language (XML) family, and in particular is wireless markup language (WML).

4. A method according to claim 2, wherein the language adapted to service data is taken from the extensible markup language (XML) family, and in particular is wireless markup language (WML).

5. A method according to claim 1, wherein the language adapted to service data is hypertext markup language (HTML) or a language derived therefrom.

6. A method according to claim 2, wherein the language adapted to service data is hypertext markup language (HTML) or a language derived therefrom.

7. A method of managing the operation of a mobile terminal in a telecommunications network, the method being of the type in which the mobile terminal is designed to operate selectively in a telephone call mode or in a navigator mode, and of the type in which a display forming part of the mobile terminal or connected to the mobile terminal is suitable for displaying a service data page formatted by a sequence of instructions, the service data page giving access to at least one service, said method comprising the step of selecting a "preferred" mobile terminal operating mode for implementing a service related to the other operating mode by incorporating a preferred mode selection instruction in said sequence of instructions, so that the mobile terminal does not leave the preferred mobile terminal operating mode during implementing of the service.

* * * * *